United States Patent
O'Neal

[11] Patent Number: 5,222,755
[45] Date of Patent: Jun. 29, 1993

[54] TRAILER LOCK
[76] Inventor: Gary L. O'Neal, 5065 McLendon Dr., Antioch, Tenn. 37013
[21] Appl. No.: 696,191
[22] Filed: May 6, 1991
[51] Int. Cl.⁵ .................................... B60D 1/60
[52] U.S. Cl. ..................... 280/507; 280/511; 70/14; 70/258
[58] Field of Search ............... 280/501, 507, 511, 513; 70/14, 258

[56] References Cited
U.S. PATENT DOCUMENTS

| | | | |
|---|---|---|---|
| 2,714,912 | 8/1955 | Gonnella | 280/511 |
| 3,233,913 | 2/1966 | Brown | 280/507 |
| 3,436,101 | 4/1969 | Hanson | 280/511 |
| 4,832,360 | 5/1989 | Christian | 280/511 |
| 5,037,122 | 8/1991 | Beckerer, Jr. | 280/507 |

Primary Examiner—David M. Mitchell
Assistant Examiner—Peter C. English
Attorney, Agent, or Firm—Leon Gilden

[57] ABSTRACT

A trailer lock for preventing the use of a conventional trailer tongue hitch on an unattached trailer vehicle. The lock comprises a towing ball securely fastened to a chain which, in a preferred embodiment, is installed in the socket of a trailer tongue to prevent an unattached trailer from being attached to an unauthorized towing vehicle.

1 Claim, 4 Drawing Sheets

PRIOR ART

TRAILER LOCK

BACKGROUND OF THE INVENTION

1. Field of the Invention

The present invention relates to trailer locks, and more particularly pertains to a new and improved trailer lock specifically designed to prevent an unattached trailer from being attached to an unauthorized towing vehicle.

2. Description of the Prior Art

The use of trailer locks is known in the prior art. More specifically, U.S. Pat. No. 4,291,557, which issued to Marshall Bulle and Dale A. Johnson on Sep. 29, 1981, discloses an antitheft device secured by sliding the device over a ball connector type trailer hitch which automatically engages the hitch by means of a spring loaded bolt, thereby to obstruct access by the ball and prevent unauthorized use of a trailer. U.S. Pat. No. 4,542,914, which issued to Lucius Shropshire on Sep. 24, 1985, discloses a hitch unit for releasably attaching a towable vehicle to a towing vehicle or to a fixed anchor. U.S. Pat. No. 4,577,884, which issued to Joel L. Harris on Mar. 25, 1986, discloses a device for preventing unauthorized intentional uncoupling or accidental uncoupling of a trailer from a towing vehicle. U.S. Pat. No. 4,774,823, which issued to Douglas A. Callison on Oct. 4, 1988, discloses a hitch lock for disabling hitching couplers of trailer vehicles. U.S. Pat. No. 4,794,769, which issued to Thomas H. Persons on Jan. 3, 1989, discloses a ball hitch lock for lockably securing the ball of a ball-type trailer hitch to a hitch tongue.

While the above mentioned devices are functional and well suited for their intended usage, none of these devices disclose a trailer lock specifically designed to prevent an unattached trailer from being attached to an unauthorized towing vehicle. Further, the devices described in the above listed patents have apparently not met with commercial success. Accordingly, it can be appreciated that there exists a continuing need for new and improved trailer locks which provide for the prevention of unauthorized towing. In this respect, the present invention substantially fulfills this need.

SUMMARY OF THE INVENTION

In view of the foregoing disadvantages inherent in the known types of trailer locks now present in the prior art, the present invention provides an improved trailer lock which comprises a simple and rugged device for preventing the unauthorized towing of a trailer vehicle. As such, the general purpose of the present invention, which will be described subsequently in greater detail, is to provide a new and improved trailer lock which has all the advantages of the prior art trailer locks and none of the disadvantages.

To attain this, the present invention comprises a trailer lock for disabling the hitching mechanism of an unattached trailer vehicle. The lock is a towing ball securely fastened to a chain and in a preferred embodiment, it is installed in the socket of a trailer tongue to prevent an unattached trailer from being attached to an unauthorized towing vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trailer lock which has all the advantages of the prior art trailer locks and none of the disadvantages.

It is another object of the present invention to provide a new and improved trailer lock which may be easily and efficiently manufactured and marketed.

It is a further object of the present invention to provide a new and improved trailer lock which is of a durable and reliable construction.

An even further object of the present invention is to provide a new and improved trailer lock which is susceptible of a low cost of manufacture with regard to both materials and labor, and which accordingly is then susceptible of low prices of sale to the consuming public, thereby making such trailer locks economically available to the buying public.

Still yet another object of the present invention is to provide a new and improved trailer lock which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 3:
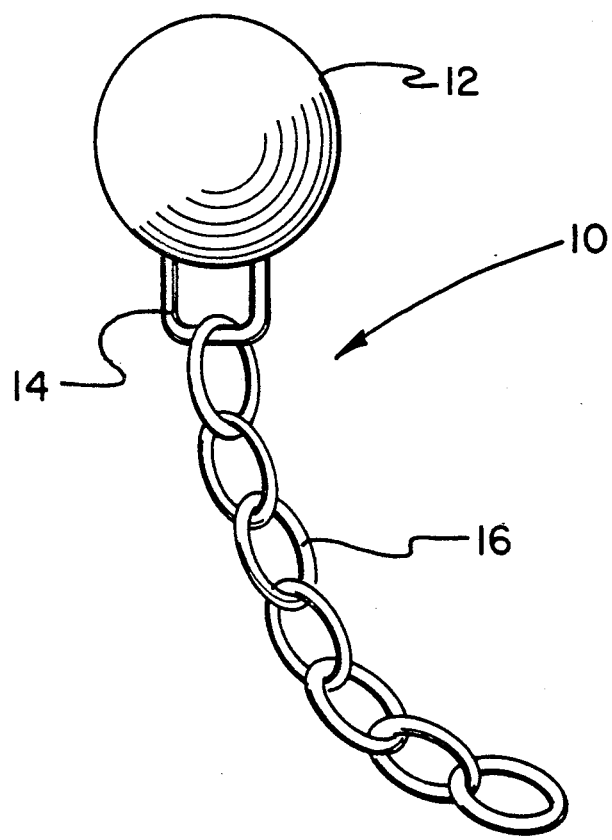
FIG. 3 is a perspective view of the trailer lock comprising the present invention.
Figure 4:
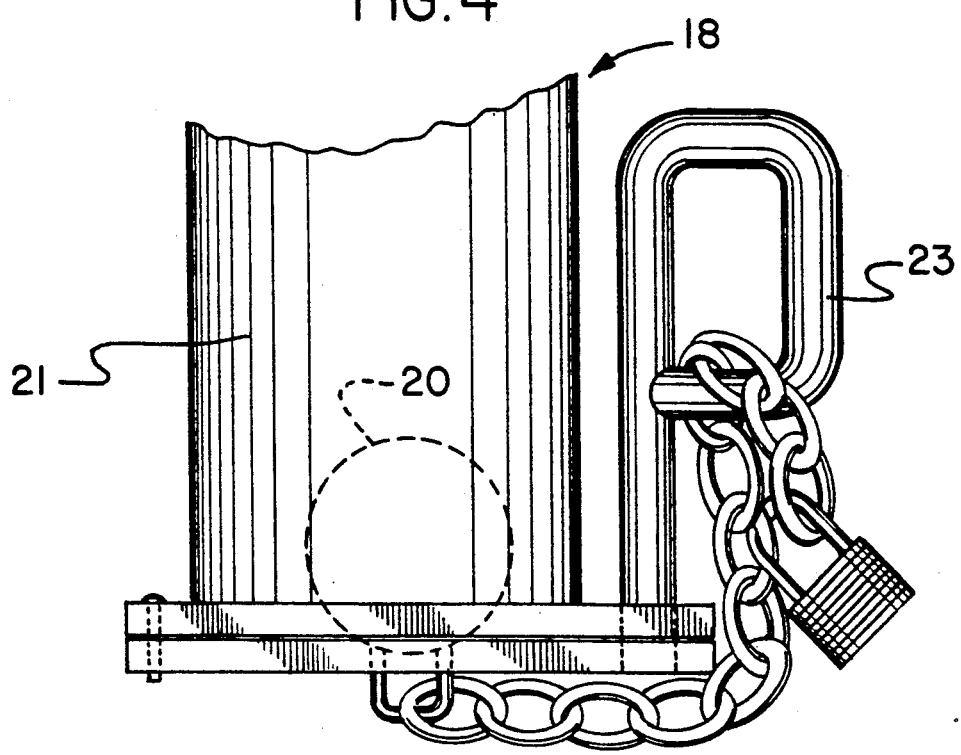
FIG. 4 is a front elevation view of the invention installed in a trailer tongue.
Figure 5:
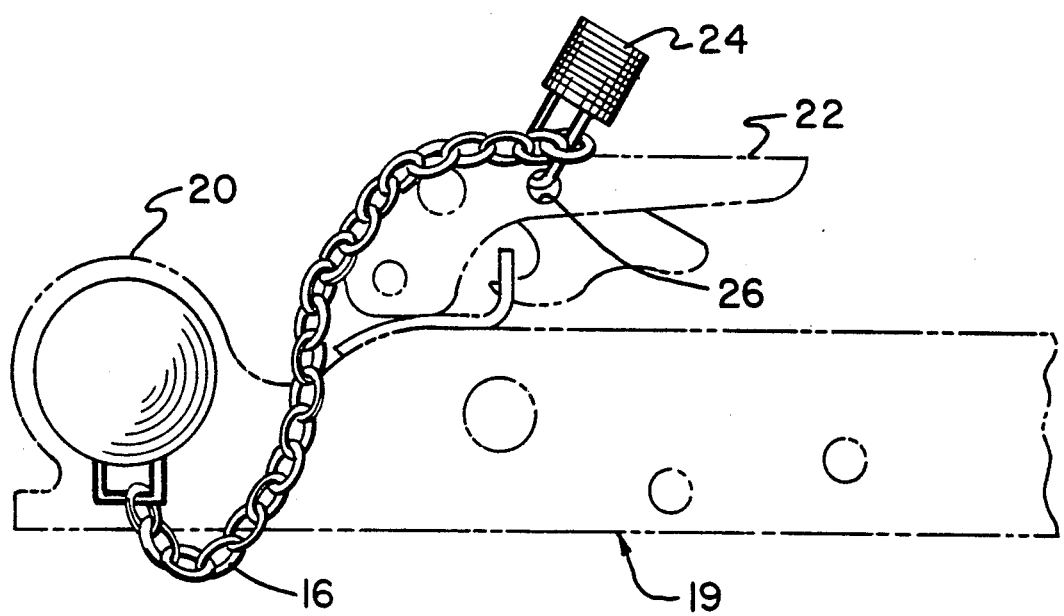
FIG. 5 is a further side elevation view of the invention installed in a different type of trailer tongue.

With reference to the drawings, and in particular to FIGS. 3, 4 and 5 thereof, a new and improved trailer lock embodying the principals and concepts of the present invention and generally designated by the reference numeral 10 will be described.

Figure 1:
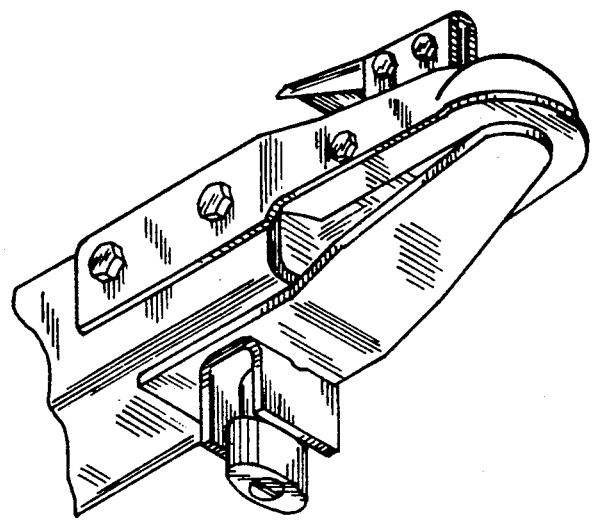
FIG. 1 is a perspective view of a prior art invention.
Figure 2:
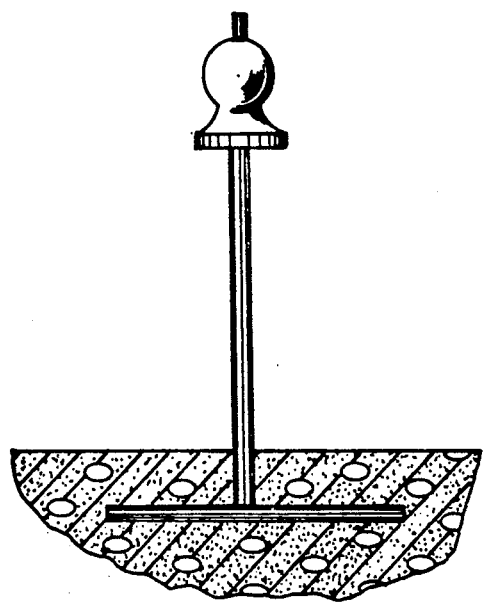
FIG. 2 is a perspective view of another prior art invention.

Initially however, reference is made to FIGS. 1 and 2 of the drawings wherein typical prior art trailer locks are illustrated. These prior art locks are similar in function to the lock comprising the present invention; however, they are designed to be permanent installations and would defeat the intent and purpose of the present invention.

The trailer lock shown in FIG. 1 is particularly described in U.S. Pat. No. 4,774,823. This lock includes a permanently mounted plate, a keeper member and a lock mechanism which prevents disattachment of an attached trailer vehicle and prevents the attachment of a disattached trailer to an unauthorized tractor vehicle. Since this lock is designed to be a permanent part of the trailer tongue, it could only be used in an application where the user owns the trailer vehicle and is willing to modify it to accept the locking mechanism.

The trailer lock shown in FIG. 2 is particularly described in U.S. Pat. No. 4,542,914. This lock includes a permanently installed device which is either secured in the ground or in some other structural material. Since this lock is designed to be used at a fixed location only, it lacks the utility of the present invention.

While both of these prior art trailer locks are well suited for their intended purpose, they would not be particularly well suited for the renter of trailer vehicles or the mobile traveler. The present invention, on the other hand, is designed to provide a simple, rugged and temporary solution to the user.

The first version of the trailer lock 10 is illustrated in FIGS. 3, 4 and 5. The device 10 is of very simple and rugged construction and consists essentially of a ball 12, a locking hasp 14 and a chain 16. The ball 12 would be the same size as a typical trailer hitch ball, i.e., 1⅞" or 2" or 2 5/16" in diameter. The locking hasp 14 is fixed to ball 12 by conventional means and is intended to connect ball 12 to chain 16. As shown in FIG. 4, the ball 20 can be selectively positioned within a ball receiving socket 21 associated with virtually any type of goose neck trailer hitch tongue 18, while the chain 16 can then be secured to a handle 23 or some other structure when the lock assembly 10 is not being used.

Referring specifically to FIG. 5, the invention is shown installed in a typical trailer tongue 19. In practice, ball 12 mounts closely within a formed socket member 20. This socket member 20 has a movable wedge or finger (not shown) located therein which is releasably secured against the undersurface of the ball 12 by a spring loaded lever 22. Upon restraining the lever 22 in its closed position, and thus locking the ball 12 in place, the chain 16 is secured by passing lock 24 through the holes 26 in the lever 22.

Figure 6:
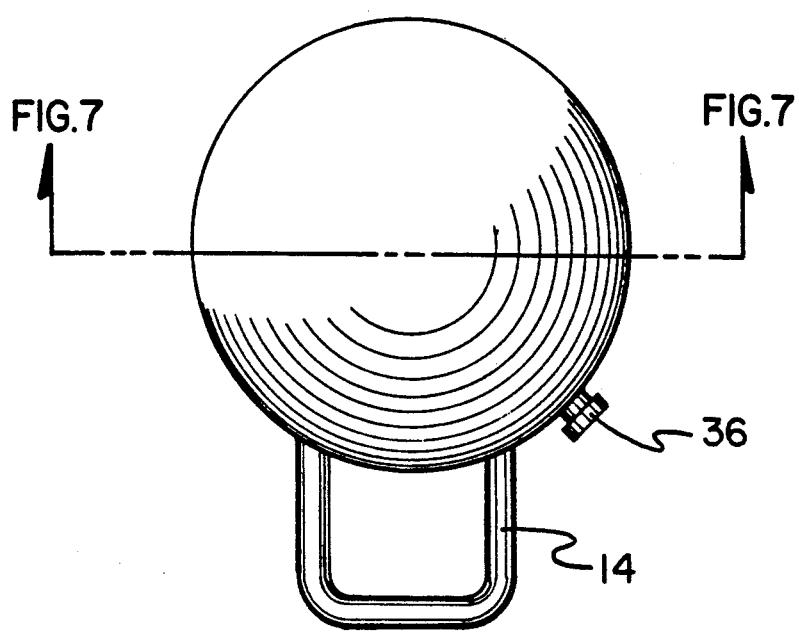
FIG. 6 is a top plan view of a second embodiment of the present invention.
Figure 7:
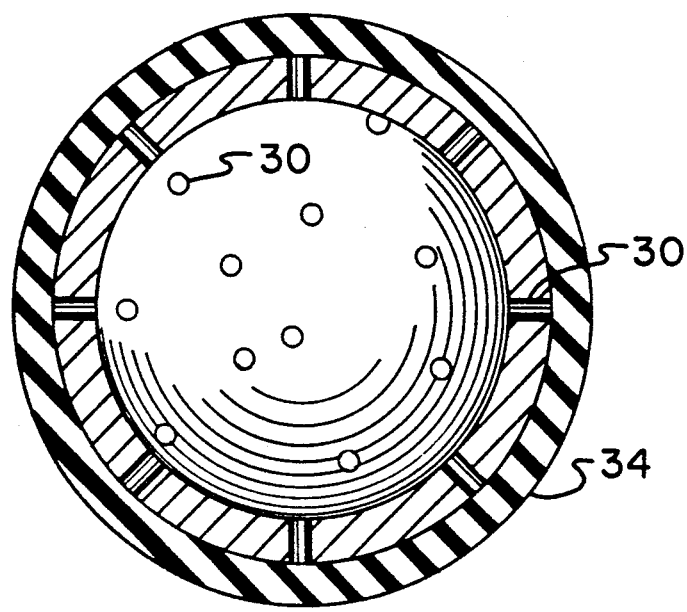
FIG. 7 is a cross sectional view of the second embodiment of the invention taken along the line 7—7 in FIG. 6.
Figure 8:
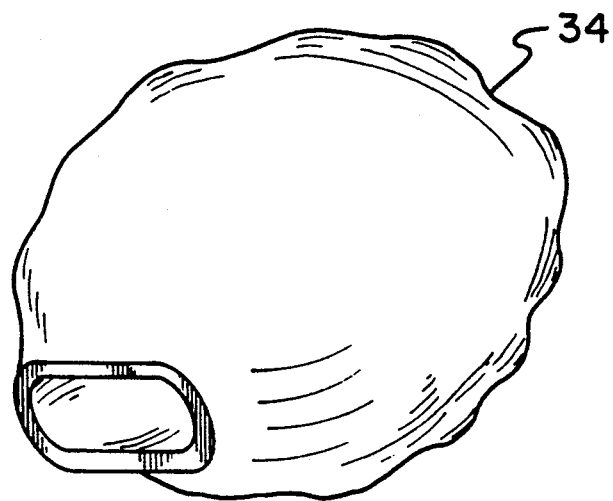
FIG. 8 is a perspective view of a replaceable stretch-on outer cover forming a part of the second embodiment of the invention.

An alternative embodiment of the invention is shown in FIGS. 6 through 8. In this embodiment, the ball 28 is similar in design to the ball 12 of the preferred embodiment with the exception of the slight modification to the construction. In this regard, referring to FIG. 7 small holes 30 extend through the ball 28 to allow oil to flow freely. The oil provides a means of lubrication for extended periods of storage, thereby preventing the rusting of ball 28 and socket 20. The small apertures 30 in the ball 28 allow oil to drain from inside of ball. An external replaceable foam rubber coating 34 is stretched over the ball 28 and is saturated with the lubricating oil so as to provide a controlled dispersion of the oil to ball 28 and socket 20. A lubricant refill hole 36 is also provided.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved trailer lock comprising:
    a towing prevention ball means selectively positionable within a socket of a trailer tongue hitch, thereby to prevent an unattached trailer from being knowingly attached to an unauthorized towing vehicle,
    a locking hasp fixedly attached to said towing prevention ball means;
    a chain attached to said towing prevention ball means by said locking hasp;
    a lock for securing a free end of said chain to a locking lever associated with said trailer tongue hitch, said lock further preventing a pivotal movement of said locking lever when said lock is attached thereto, thereby to prevent a removal of said towing prevention balls means from said socket within said trailer tongue hitch; and lubricant dispensing means including a cavity formed interiorly of said ball means to form an oil reservoir therein, at least one aperture in said towing prevention ball means and further including a replaceable cover on the exterior of said ball means, said replaceable cover being of a foam rubber construction to facilitate a controlled dispersion of said lubricant on the exterior of said ball means, said at least one aperture extending between said cavity and said replaceable cover to facilitate the flow of oil from said cavity to said foam cover, and oil refill passage means extending between said cover and said cavity for supplying oil to said cavity.

* * * * *